Oct. 14, 1969     A. J. SORIENTE ET AL     3,472,382
UNDERDRAIN STRAINERS
Filed Aug. 10, 1966
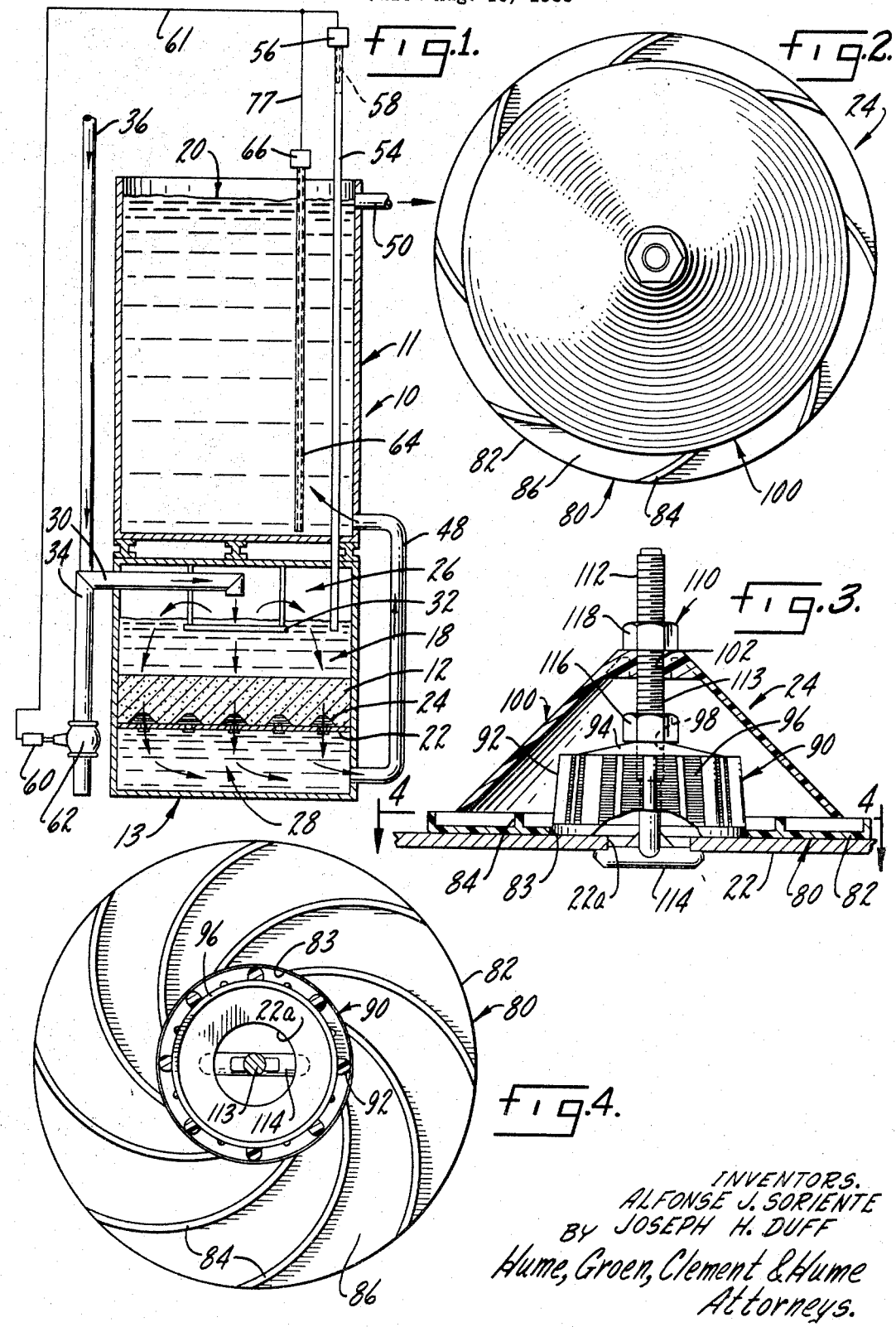
INVENTORS.
ALFONSE J. SORIENTE
BY JOSEPH H. DUFF
Hume, Groen, Clement & Hume
Attorneys.

United States Patent Office 3,472,382
Patented Oct. 14, 1969

3,472,382
UNDERDRAIN STRAINERS
Alfonse J. Soriente, Gillette, and Joseph H. Duff, Basking Ridge, N.J., assignors to Union Tank Car Company, Chicago, Ill., a corporation of Delaware
Filed Aug. 10, 1966, Ser. No. 571,595
Int. Cl. B01d 41/02
U.S. Cl. 210—279     3 Claims

ABSTRACT OF THE DISCLOSURE

Improved strainer means for the bottom plate supporting filter beds and the like comprise swirler means, strainer means, and cover means. The swirler means comprise an annular-shaped flat plate having a plurality of upright, radially extending arcuate ribs forming a horizontal, arcuate passageway between them. The swirler means rest on the bottom plate with the central opening aligned with an opening in the bottom plate. The cover means are generally conical in shape, and have a diameter less than the diameter of the swirler means so that the cover means rest on the arcuate ribs. The strainer means are mounted within the central opening of the swirler means, and also within the cover means, so that fluid passing through the strainer assembly passes through the strainer means. Means are also provided to hold the strainer assembly in position on the bottom plate.

---

This invention relates to underdrain strainers for filters, ion exchange beds and the like.

A typical method of filtering a liquid is to pass the liquid through a filter bed of suitable filter media, such as sand or other granular material well known in the art, which removes the suspended matter from the liquid. The filtered liquid passes through the strainers on the false bottom, which retains the filter bed, to the underdrain compartment. The filtered liquid passes from the underdrain compartment to the service line through suitable conduits.

After a period of time the filter bed becomes clogged and fouled with solid, foreign material removed from the untreated liquid during filtration and, accordingly, becomes less efficient. As the filter bed becomes clogged, the pressure differential between the upstream side and the downsteam side of the filter bed increases. Thus, the head loss or increased pressure drop across the filter bed can be used as a means to determine when the filter bed should be cleaned.

One method of cleaning the filter bed is to backwash the bed with filtered liquid by introducing a reverse flow of filtered liquid through the filter bed to carry the foreign matter in the filter bed to waste. Heretofore, however, the strainer designs have not effectively cleaned the areas immediately between adjacent strainers. To prevent this problem a sub-fill layer of non-filtering material is added below the filter bed to disperse the backwash water. In this manner by the time the backwash water reaches the filter bed it is dispersed to effect cleaning of the entire filter bed. The sub-fill layer does not enhance the filtering operation, increases the thickness of the total bed, must be periodically replaced, and is an additional cost, which are disadvantageous in a filter system.

Additional strainers may, of course, be added to the false bottom. This, however, increases the cost of the filter because of the perforating operation to the false bottom and the cost of the additional strainers.

It is, therefore, an object of the present invention to provide a strainer for a filter and the like which will, during backwash of the bed, afford cleaning of the areas immediately between the stainers.

It is a further object to provide a strainer for a filter and the like which is simple in construction and easy to install in a filter.

The invention, both as to its organization and method of operation, taken with further objects and advantages thereof, will be understood by reference to the following description taken in conjunction with the accompanying drawings, in which:

FIGURE 1 is a side elevational view, partially in section, illustrating a filter having strainers embodying the features of the present invention;

FIGURE 2 is an enlarged plan view of the strainer shown in FIGURE 1;

FIGURE 3 is a vertical cross-sectional view of the strainer shown in FIGURE 2; and FIGURE 4 is a sectional view of the strainer shown in FIGURE 2 taken along line 4—4 of FIGURE 3;

Referring now to the drawings, and more particularly to FIGURE 1, there is illustrated a filter 10 utilizing the strainers of the present invention. The filter 10 is of the type described and illustrated in applicants' U.S. Patent No. 3,193,099, issued July 6, 1965, and assigned to the assignee of the present application. The general operation and structure of the filter 10 are readily apparent to one with ordinary skill in the art upon a review of U.S. Patent No. 3,193,099, and, accordingly, will merely be briefly discussed herein.

The filter 10 has a filter bed 12 through which the raw liquid is passed during the service cycle to remove solid foreign materials therefrom. Filtered water from the filter 10 is passed to service. After the filter bed 12 has become clogged with foreign particles removed from the raw liquid, the filter bed 12 is backwashed with treated liquid to remove the foreign material therefrom.

To these ends, the filter 10 comprises an upper, open cylindrical tank 11 mounted by suitable means upon a closed cylindrical tank 13. The tank 11 forms a backwash storage chamber 20 while the tank 13 forms a filter chamber 18. The filter bed 12 is situated in the filter chamber 18 on a false bottom member 22 with strainers 24 embodying the features of the present invention. In this manner, an inlet compartment 26 and an underdrain compartment 28 are formed above and below, respectively, the filter bed 12 in the filter chamber 18.

Raw water from a suitable source passes through an inlet pipe 36 to transfer conduit 30 which extends into and communicates with the inlet compartment 26 of the filter chamber 18. Within the inlet chamber 26 there is mounted a baffle 32 which distributes incoming raw liquid from the transfer conduit 30 evenly across the filter bed 12. Thus, during the service cycle, raw liquid from the transfer conduit 30 flows past the baffle 32 into the filter chamber 18 and through the filter bed 12 and the strainers 24 into the underdrain compartment 28. The insoluble materials suspended in the raw liquid are thereby extracted and retained in the filter bed 12.

The treated water passes from the underdrain compartment 28 to a connecting duct 48 which communicates with the bottom of the backwash storage chamber 20. The filtered liquid passes from the connecting duct 48 into the backwash storage chamber 20. A service outlet pipe 50 communicates with the top of the backwash storage chamber 20. The backwash storage chamber 20 fills until the filtered liquid reaches a level of the service outlet pipe 50, at which time the treated liquid passes to the service outlet pipe 50. The liquid in the backwash storage chamber 20 is used to clean the filter bed 12 during the backwash cycle.

A high level control pipe 54 communicates with the inlet chamber 26 of the filter chamber 18. The control pipe 54 is a vertically extending pipe extending through the backwash storage chamber 20, as shown in the drawings, or positioned outside the filter apparatus 10. At its upper end, which extends above the high liquid level in the backwash storage chamber 20, the high level control pipe 54 has a high level sensing switch 56 with a probe 58. This switch 56 is actuated when liquid, rising in the high level pipe 54, contacts the probe 58. The point at which the high level control switch 56 is actuated represents a predetermined pressure drop across the filter bed 12.

The high level control switch 56 is electrically connected with an electrical actuating means 60, as indicated diagrammatically by line 61. The electrical actuating means 60 is in turn connected to and mechanically controls the opening and closing of a butterfly valve 62 or the like positioned in a backwash line 34 connected to the inlet pipe 36 and the transfer conduit 30.

When the high level sensing switch 56 is actuated, an electrical impulse is transferred to the electrical actuating means. This causes the electrical actuating means 60 to open the valve 62 and initiates the backwash cycle wherein the filtered liquid in the backwash storage compartment 20 will flow through the connecting duct 48 into the underdrain compartment 28 of the filter chamber 18 and upwardly through the strainers 24 and filter bed 12. The backwash liquid passes through the transfer conduit 30 to the inlet pipe 36 and out to drain through the backwash pipe 34 and the valve 62. The backwash liquid carries the foreign matter from the filter bed 12 with it.

A low level control pipe 64 extends downwardly into the backwash storage chamber 20 and has its bottom outlet communicating with the lower portion of the backwash storage chamber 20. A low level sensing switch 66 is attached to the top of the low level control pipe 64 and has a probe 68 which extends downwardly to the outlet of the pipe 64. The low level sensing switch 66 is excited or actuated when liquid in the backwash storage chamber 20 drops to a level lower than the end of the probe 68. The low level sensing switch 66 is also electrically connected with the electrical actuating means 60 as indicated diagrammatically by a line 77 connected to the line 61. When the low level sensing switch 66 is actuated, an electrical impulse is transferred to the electrical actuating means 60. This actuates the electrical actuating means 60 to close the valve 62. In this manner, when the level of filtered liquid in the backwash storage chamber 20 has dropped to a level below the end of the probe 68, the valve 62 is closed and the service cycle of the filtering apparatus 10 begins again.

Referring now to FIGURES 2–4 the strainer assembly 24 embodying the features of the present invention will be discussed in more detail. The strainer assembly 24 comprises swirler means 80, strainer means 90, cover means 100 and fastening means 110. The swirler means 80 comprises a flat annular-shaped metal or plastic plate 82 having a central opening 83 and a plurality of upright radially extending, arcuate ribs 84 on the upper portion thereof. The ribs 84 form horizontal radially extending arcuate grooves or passageways 86 which distribute backwash liquid in an outward, swirling motion from the strainer assembly 24 to clean the filter bed between adjacent strainer assemblies. The swirler means 80 rests upon the bottom plate 22 of the filter 10 with its opening 83 substantially concentric with a hole 22a in the bottom plate 22.

The strainer means 90 rests upon the bottom plate 22 within the opening 83 of the swirler means 80 and comprises an open bottom generally cylindrically shaped member having a side wall 92 and a top wall 94. The side wall 92 has a plurality of small slots or perforations 96 which prevent filter media or the like from passing through the strainer assembly 24 to the underdrain compartment 28 during the service cycle. The strainer means 90 has a hole 98 in the top wall 94 for the fastening means 110.

The cover means 100 comprises a conically-shaped imperforate member which has a diameter less than the diameter of the swirler means 80, so that the cover means 100 rests upon the swirler means 80. A hole 102 in the top is for the fastening means 110.

The swirler means 80, strainer means 90 and the cover means 100 are held in position by the fastening means 110 which comprises a threaded T-bolt 112 and nuts 116 and 118. The T-bolt 112 has a threaded shaft 113 and a head 114. The latter is placed through the opening 22a by tilting the T-bolt 112 and then returned to the vertical position so that the head 114 grips the bottom plate 22. The swirler means 80 and the strainer means 90 are placed over the upwardly extending shaft 113 and the strainer means 90 is held in position by the nut 116 threadedly engaging the shaft 113. The cover 100 is then placed over the upwardly extending shaft 112 and securely held in position by the nut 118.

In this manner the cover means 100 and the swirler means 80 define radially extending, arcuate passageways in a horizontal plane very close to the bottom plate through which the backwash water from the backwash storage compartment passes during the backwash cycle. The backwash water passes through the opening 22a in the bottom plate 22 and the strainer means 90 and into the cover means 100 and is discharged at high velocity from the passageways 86 in a substantially horizontal plane with a swirling motion. This will agitate the filter media adjacent the strainer assembly 24 and cause the cleaning and recirculation of the filter media. As filter media is moved away from the strainer assembly 24 by the high velocity backwash water it is replaced by filter media sliding down the cover means 100. In this manner the filter media between the strainer assemblies 24 is effectively cleaned. Of course, after the backwash water has moved upwardly about 12–18" in the bed the flow is uniformly distributed throughout the bed and in a vertical direction to effect cleaning of the rest of the bed.

A metering tube may be used with the strainer assembly 24 and will be understood by one with ordinary skill in the art.

The filtering apparatus 10 may be used to filter water streams, sugar solutions, hydrocarbon streams and the like as will be readily appreciated by one with ordinary skill in the art. The particular filter media employed is a matter of choice, the selection of the filter media being dependent, of course, upon the liquid to be treated and the impurities contained therein. Scouring gases may be employed, such as air, nitrogen, oxygen and the like, as will be understood by one with ordinary skill in the art.

The service outlet pipe 50 may, of course, be connected directly to the connecting duct 48. In such instances, there is a vertical extension of the connecting duct 48 to which the outlet pipe 50 is attached. As the service cycle begins filtered liquid will enter the backwash storage chamber 20 until the liquid level therein reaches that of the outlet pipe 50. Then the filtered liquid will by-pass the backwash storage chamber 20 and go directly to the service line.

While the embodiments described herein are at present considered to be preferred, it will be understood that various modifications and improvements may be made therein and it is intended to cover in the appended claims all such modifications and improvements as fall within the true spirit and scope of the invention.

What is claimed is:

1. In an apparatus including a filter bed and a bottom plate supporting said bed, said bottom plate having at least one opening, the improvement being a strainer assembly comprising: swirler means comprising an annular-shaped flat plate having a plurality of upright, radially extending arcuate ribs forming horizontal, arcuate passageways therebetween, said swirler means resting on said bottom plate with the central opening in said annular-shaped plate aligned with the opening in said bottom plate; conically-shaped cover means having a diameter less than the diameter of said swirler means, said cover means resting on said arcuate ribs; strainer means in said central opening of said swirler means and mounted within said cover means so that fluid passing through said strainer assembly passes through said strainer means; and means to hold said strainer assembly in position on said bottom plate.

2. The strainer assembly as defined in claim 1 wherein said means to hold said strainer assembly comprises a T-bolt having a threaded shaft which extends upwardly through holes in said strainer assembly and cover means; and nuts threadably engaging said shaft to hold said strainer means and cover means in position.

3. The apparatus as defined in claim 2 wherein said bottom plate has a plurality of openings, and wherein each of said openings is associated with a strainer assembly.

References Cited

UNITED STATES PATENTS

| | | | |
|---|---|---|---|
| 460,311 | 9/1891 | Perkins | 210—292 |
| 473,011 | 4/1892 | Moore | 210—292 |
| 493,938 | 3/1893 | Moore | 210—292 X |
| 3,008,652 | 11/1961 | McLean | 239—463 X |
| 3,279,610 | 10/1966 | Scholten et al. | 210—289 X |

FOREIGN PATENTS 201,278  4/1939  Switzerland.

SAMIH N. ZAHARNA, Primary Examiner

U.S. Cl. X.R.

210—292, 293; 239—463